United States Patent [19]

Rajakovics

[11] 3,990,951

[45] Nov. 9, 1976

[54] METHOD AND APPARATUS FOR PREHEATING DISTILLATE TO BE DEGASSED

[75] Inventor: Gundolf E. Rajakovics, Vienna, Austria

[73] Assignee: Vereinigte Edelstahlwerke AG, Vienna, Austria

[22] Filed: Dec. 5, 1974

[21] Appl. No.: 529,976

[30] Foreign Application Priority Data

Dec. 7, 1973  Austria .......................... 10281/73

[52] U.S. Cl. .............................. 203/11; 55/36; 55/46; 55/54; 202/203; 202/182; 202/185 R; 159/24 R; 203/40; 203/39; 252/301.1 W

[51] Int. Cl.² ...................... B01D 3/00; F28B 9/02; B01D 19/00

[58] Field of Search ................ 203/39, 24, 27, 85, 203/87, 95, 10, 11; 202/203, 177–180, 181, 182, 185 R, 185 A, 173; 159/24 R; 55/46, 36, 54; 252/301.1 W

[56] References Cited
UNITED STATES PATENTS

| | | |
|---|---|---|
| 1,917,841 | 7/1933 | Hughes et al. .................... 159/24 R |
| 3,293,151 | 12/1966 | Holzer et al. ....................... 202/181 |
| 3,346,033 | 10/1967 | Olejniczak ......................... 203/95 X |
| 3,803,001 | 4/1974 | Carnavos .......................... 202/173 X |

*Primary Examiner*—James H. Tayman, Jr.

[57] ABSTRACT

Distillate produced by the condensing stage of an evaporation installation is conducted to a reservoir to be preheated to its boiling point in preparation for a further degassing step. The required rise in temperature of the distillate in the reservoir is effected by the heat of condensation of a portion of the steam directed via a main pipe from the evaporating stage of the installation to the condensing stage. The required contacting of such steam portion with the reservoir is effected by diverting, to the reservoir, a portion of the steam in the main pipe via a diaphragm or another blocking member interposed in the main pipe and a branch pipe that communicates with the main pipe upstream of the diaphragm member and extends to the reservoir. A conventional overflow pipe disposed at a predetermined height in the reservoir is effective to conduct the heated distillate to the subsequent degassing stage.

5 Claims, 1 Drawing Figure

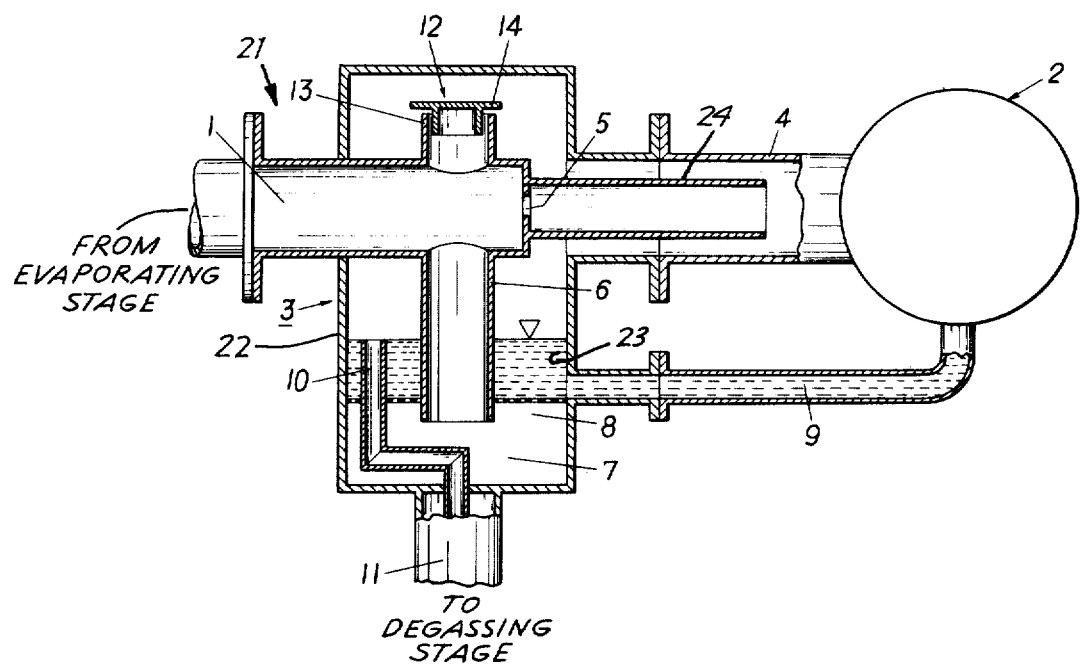

METHOD AND APPARATUS FOR PREHEATING DISTILLATE TO BE DEGASSED

BACKGROUND OF THE INVENTION

Evaporation installations are frequently employed for the purification of liquids, particularly radioactive waste water. The distillate resulting from such installations are ordinarily conducted from the condensing stage thereof to a final degassing stage to remove the remaining volatile impurities therefrom.

In order to obtain an effective degassing effect, it is necessary that the temperature of the distillate to be conducted to the degassing stage be at or slightly below its boiling point. Since the temperature at the outlet point of the condensing stage is, for economic reasons, generally substantially below its boiling point, preheating of the distillate prior to the degassing is required.

Such preheating can be obtained in various known ways, all of which require substantial additional amounts of heat as well as a relatively large and expensive technical plant. It is known to preheat common water to be degassed using a heat exchanger heated by steam. The temperature of such water at the entrance of the heat exchanger is relatively constant. Therefore it is not difficult to control such a preheater. However, because of the great difference between the heat of condensation of water and the specific heat thereof, any slight unavoidable change in the amount of the condensing vapor leads to a strong change in the temperature of the distillate. Such strong temperature oscillations in the distillate cannot be totally removed and can only be diminished through highly-sensitive and correspondingly expensive and disturbance-susceptible control arrangements. So it is much more difficult to control preheating of distillate than of common water. Moreover, such arrangement must obviously be laid out for the lowest possible temperature of the distillate, which creates additional expense.

SUMMARY OF THE INVENTION

The disadvantages of the known preheating arrangements are obviated by the method and apparatus of the instant invention, which illustratively operates in an evaporation arrangement whose condensing stage receives input steam from the evaporating stage via a main pipe.

In an illustrative embodiment, the preheater includes a housing that contains a reservoir in which the distillate may be heated. The distillate is introduced into the reservoir by means of an outlet pipe of the condensing stage.

In order to effect the preheating of the distillate in the reservoir to approximately its boiling point, a portion of the input steam progressing in the main pipe from the evaporating stage to the condensing stage is shunted off by means of a branch pipe within the housing, such branch pipe extending to the reservoir to discharge the steam portion so that the latter can be condensed by the distillate in the reservoir; the resulting heat of condensation is effective to provide the required temperature rise of such distillate. Such branch pipe communicates with the main pipe upstream of a diaphragm member which blocks from the condensing stage the portion of the steam which is to be directed via the branch pipe to the reservoir.

The heated distillate is conducted to the degassing stage via an overflow pipe disposed in the reservoir at a predetermined height therein. The arrangements in accordance with the invention are particularly advantageous since they employ only a predetermined small portion of the steam normally present in the pipe between the operating stages, so that no additional source of steam for preheating the distillate is required. Moreover, the arrangement operates strongly self-controlling because of the small temperature difference between the condensing vapor and the desired temperature of the distillate. The outlet temperature of the distillate therefore will be approximately constant and nearly independent on the inlet temperature of the distillate coming from the condensing stage.

BRIEF DESCRIPTION OF THE DRAWING

The invention is further set forth in the following detailed description taken in conjunction with the appended drawing, in which the single FIGURe illustrates a schematic diagram of a preheating arrangement constructed in accordance with the invention for association with the evaporating, condensing and degassing stages of a water purification installation.

DETAILED DESCRIPTION

Referring now to the drawing, steam produced by the evaporating stage of a water purification installation (not shown) is directed to a condensing stage 2 of the installation via a main pipe 21 that includes a first section 1 in communication with a second section 4. The main section 1 extends through a housing 22 of a preheater 3 constructed in accordance with the invention for raising the temperature of distillate exiting from the condensing stage 2 via pipe 9 for efficient application to a subsequent degassing stage (not shown).

The pipe 9 extends through the wall 22 of the preheater 3 and terminates in a reservoir section 23 in such preheater. The distillate introduced into the reservoir 23 via the pipe 9 is preheated in accordance with the invention by means of steam introduced into a chamber 7 of the preheater, such chamber being disposed below the reservoir 23 and communicates therewith via an apertured plate 8 in the manner described below. After the preheating step in the unit 3, the heated distillate is conducted to the degassing stage via an overflow pipe 10 and an outlet pipe 11, the overflow pipe being disposed at a predetermined level in the reservoir as shown. The portion of the main pipe section 1 that extends within the preheater housing 22 has disposed therein a diaphragm or other blocking member 5, which inhibits the passage to the condensing stage 2 of a predetermined relatively small portion of the steam progressing in the main pipe 21. (Illustratively, the blocked portion of the steam may amount to 10–20%). The main portion of the steam which is directed to the condensing stage 2 proceeds via a portion 24 of the main pipe 21, the outlet of which communicates with the pipe section 4 whose inlet portion communicates with the interior of the preheater 3. The outlet portion of the pipe section 4 terminates at the condensing stage 2.

The portion of the steam progressing in the main pipe 21 that is blocked by the diaphragm member 5 is directed downwardly into the expansion space 7 below the reservoir 23 by means of a branch pipe 6, which communicates with the main pipe section 1 upstream of the diaphragm member 5 and extends downwardly through the reservoir 23 and into the space 7 as shown. The steam exiting from the outlet portion of the branch pipe 6 flows upwardly through the apertures in the plate 8 into the distillate contained in the reservoir 23.

The resulting heat given up by the steam as it is condensed by contact with such distillate raises the distillate to a desired outlet temperature which is at or slightly below its boiling point, so that effective degassing can take place in the subsequent stage of the installation. The steam in excess, which is not needed for preheating the distillate and therefore will not be condensed passing the distillate of reservoir 23 is directed through pipe 4 to the condensing stage 2.

In order to regulate the steam pressure conditions within the T-shaped pipe junction illustrated in the preheater 3, a relief valve 12 can be provided in the vicinity of the branch pipe 6 and the diaphragm member 5. In the illustrated embodiment, such relief valve can be formed from an upward extension 13 of the main pipe section 1, such section 13 receiving therein a weighted cap 14. The weight of the cap is effective to determine the operating pressure within the portion of the main pipe 1 upstream of the diaphragm member 5.

It will be evident from the above description that an economical and efficient technique has been made available for the required preheating of the distillate prior to the degassing step. Since the heating medium consists of a portion of the normal steam travelling from the evaporation to the condensing stages of the installation, an external source of heat is not required. Moreover, since the temperature difference between the heated distillate exiting from the reservoir 23 and the steam introduced into such reservoir via the pipe 6 and the chamber 7 is very small, the large temperature fluctuation characteristic of the prior art because of the large difference between the heat of condensation of the distillate and its specific heat is avoided.

In the foregoing, the invention has been described in connection with a preferred technique thereof. Many variations and modifications will now occur to those skilled in the art. For example, other techniques of introducing a portion of the steam from the evaporating stage into the reservoir can be employed. It is accordingly desired that scope of the appended claims not be limited to the specific disclosure herein contained.

What is claimed is:

1. In a process for distilling a liquid wherein the liquid is evaporated into steam, condensed in a separate stage to form a distillate, and then degassed, an improved method of preheating the distillate to approximately its boiling point temperature before the degassing step which comprises the steps of bypassing a portion of the steam produced by the evaporating step, introducing the distillate produced by the condensing step into a separate reservoir, and directly contacting the distillate in the reservoir with the bypassed portion of the steam resulting from the evaporating step so that the heat of the resulting condensation of at least a part of the steam portion effects the heating of the distillate to approximately its boiling point.

2. In an evaporation arrangement having a condensing stage for receiving input steam via a main pipe from an evaporating stage to be condensed to distillate, and further having a degassing stage to which distillate from the condensing stage is directed, an improved arrangement for preheating the distillate prior to its application to the degassing stage which comprises, in combination, a housing having a reservoir in which the distillate may be heated, means disposed within the main pipe for blocking a portion of the input steam from reaching the condensing stage, means including a branch pipe communicating with the main pipe upstream of the blocking means for introducing the blocked portion of the steam into the reservoir to directly contact the distillate and to thereby effect the heating of the distillate via the condensation of at least a part of the blocked steam portion, means for coupling the distillate from the condensing stage to the reservoir, means for directing to the condensing stage that part of the blocked portion of the steam which has not been condensed in heating the distillate, and means for coupling the heated distillate from the reservoir to the degassing stage.

3. An arrangement as defined in claim 2, in which the means for coupling the heated distillate to the degassing means comprises an overflow pipe disposed at a predetermined height in the reservoir.

4. An arrangement as defined in claim 2, in which the blocking means are diaphragm members.

5. An arrangement as defined in claim 2, in which the blocking means are relief valves.

* * * * *